(12) United States Patent
Eriksen et al.

(10) Patent No.: US 6,688,419 B2
(45) Date of Patent: Feb. 10, 2004

(54) VEHICLE HYDRAULIC DRIVING SYSTEM

(75) Inventors: Uffe Lykke Eriksen, Silkeborg (DK); Welm Friedrichsen, Nordborg (DK)

(73) Assignee: Sauer-Danfoss Holding A/S, Nordborg (DK)

(*) Notice: Subject to any disclaimer, the term of this patent is extended or adjusted under 35 U.S.C. 154(b) by 247 days.

(21) Appl. No.: 09/997,017

(22) Filed: Nov. 28, 2001

(65) Prior Publication Data

US 2002/0070068 A1 Jun. 13, 2002

(30) Foreign Application Priority Data

Nov. 29, 2000 (DE) .......................... 100 59 192

(51) Int. Cl.[7] .................. B60K 17/14; B60K 17/00; F16D 65/24; B60T 13/16; B60T 13/70

(52) U.S. Cl. .................. 180/308; 180/307; 188/170; 303/11; 303/15

(58) Field of Search .................. 180/305, 306, 180/307, 308; 188/170; 303/3, 10, 15, 11

(56) References Cited

U.S. PATENT DOCUMENTS

| | | | | |
|---|---|---|---|---|
| 3,582,150 A | * | 6/1971 | Williams et al. | 303/9 |
| 3,802,746 A | * | 4/1974 | Walser | 303/10 |
| 4,254,845 A | * | 3/1981 | Braun | 180/306 |
| 4,402,181 A | * | 9/1983 | Acker et al. | 60/427 |
| 5,895,099 A | | 4/1999 | Diecke et al. | |
| 6,168,245 B1 | * | 1/2001 | Siegel et al. | 303/115.4 |
| 6,594,993 B1 | * | 7/2003 | Friedrichsen et al. | 60/442 |

FOREIGN PATENT DOCUMENTS

DE  19962807  7/2001

* cited by examiner

*Primary Examiner*—G B Klebe

(57) ABSTRACT

A hydraulic drive for a vehicle has a pressure source (7) generating a predetermined pressure for maintaining the operating pressure of a hydraulic motor (5), a braking cylinder (18) with a spring chamber (20) comprising a spring arrangement (19) for operating a braking arrangement (17) and a release chamber (21) that can be acted upon by pressurised fluid from the pressure source (7) against the force of the spring arrangement (19) with the purpose of retaining the braking device (17) in its release position, and comprises a braking control valve (22) that, in a release position, releases a flow from the pressure source (7) to the release chamber (21).

4 Claims, 1 Drawing Sheet

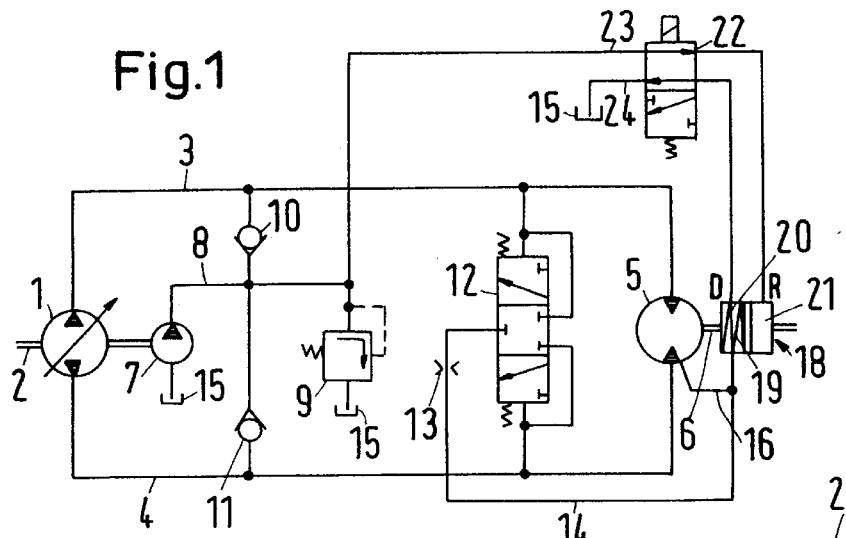
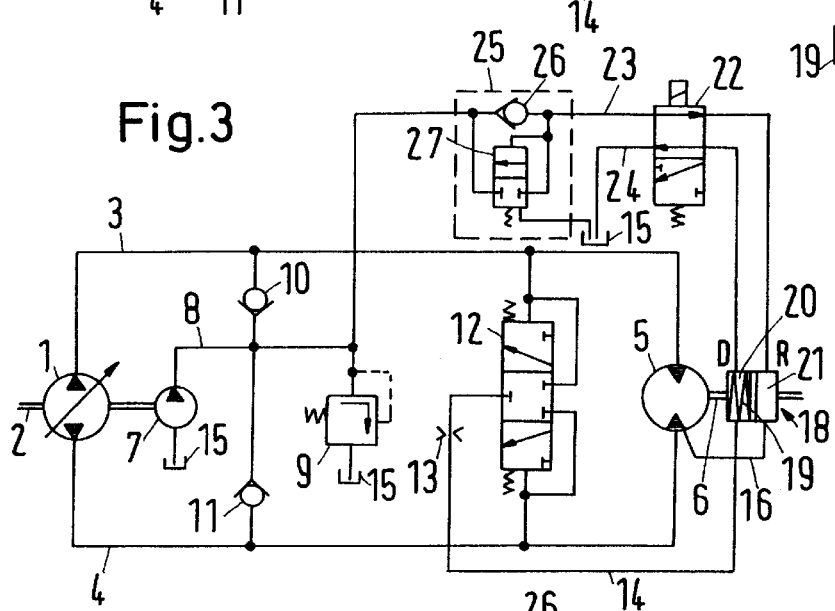
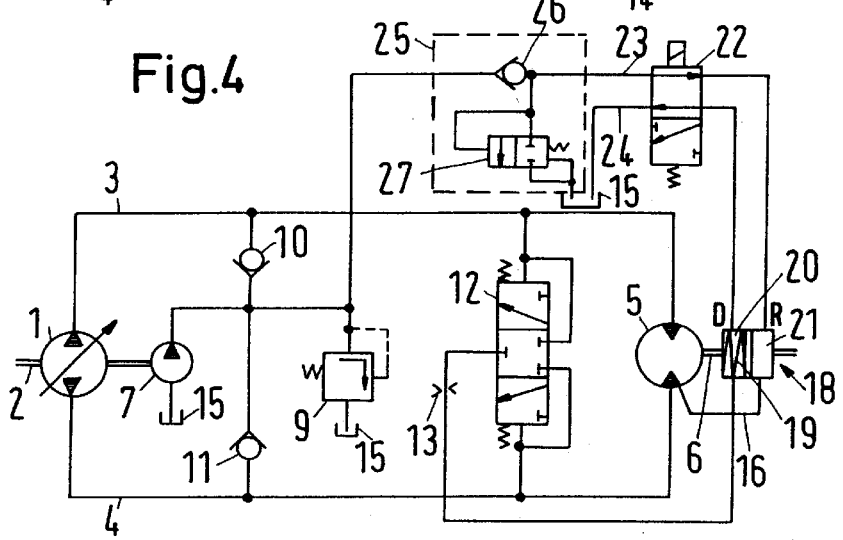

VEHICLE HYDRAULIC DRIVING SYSTEM

SUMMARY OF THE INVENTION

The invention relates to a hydraulic driving device for a vehicle, having a pressure source generating a predetermined pressure for maintaining the operating pressure of a hydraulic motor, a braking cylinder with a spring chamber comprising a spring arrangement for operating a braking arrangement and a release chamber that can be acted upon by pressurized fluid from the pressure source against the force of the spring arrangement with the purpose of retaining the braking device in its release position, and having a braking control valve that, in a release position, releases a flow from the pressure source to the release chamber

FIELD OF THE INVENTION

This invention relates to a driving device particularly suited for agricultural and industrial working vehicles, like, for instance, tractors, harvesters or construction machines, and is mainly used in compact loaders.

BACKGROUND OF THE INVENTION

A driving device related to this invention is shown in EP 0 909 690 A2. Further to a pump supplying, in a closed circuit, a hydraulic motor, which drives wheels of the vehicle, it comprises an auxiliary pump, which generates a predetermined load pressure, which is also supplied to the release chamber in the braking cylinder. When the load pressure ceases, only the spring arrangement acts to brake the vehicle. When, however, the braking control valve is activated, the load pressure in the release chamber renders the spring arrangement in the spring chamber inactive. When, however, a fault occurs, which requires braking; the braking control valve is deactivated, so that the spring arrangement, supported by the load pressure in the spring chamber, ensures a safe braking, also in relation to a rotation of the hydraulic motor. On swift movements of a tool operated by the working hydraulics, however, cases may occur, in which the pressure supplied to the braking cylinder gets too low, so that the braking device is activated accidentally, thus braking the vehicle. This may, for example, be the case, when traction acts upon the piston rod of a working cylinder, for example when a grab of an excavator, filled with earth, is lowered. On a swift movement of piston and piston rod, more fluid then flows into than out of the working cylinder, as the active surface of the side of the piston, which is connected with the piston rod, is reduced in relation to that of the other end of the piston by the cross-sectional area of the piston rod. At the same time, an increased fluid consumption occurs. Further, the pressure in the release chamber of the braking cylinder may briefly drop below the release pressure, when the speed of the combustion engine driving the pump, and through this also the hydraulic motor and the driving wheels, is reduced by the driver or by an increasing load on the vehicle during operation.

Also in connection with the driving device disclosed in the German patent application 199 62 807, not yet published, similar cases may occur, as described in detail below on the basis of FIG. 1 of the enclosed drawings.

Therefore, a principal object of this invention is to provide a hydraulic driving arrangement for a vehicle in which an unintended activation of the braking device, without the occurrence of an emergency, is prevented.

These and other objects will be apparent to those skilled in the art.

BRIEF DESCRIPTION OF THE DRAWINGS

FIG. 1 is a simplified block schematic diagram of a prior art driving device for a vehicle shown in the previous patent application DE 199 62 807 A1;

FIG. 2 is a schematic drawing of a braking cylinder with braking arrangement;

FIG. 3 is a simplified block schematic diagram of a driving arrangement according to the invention; and FIG. 4 is a simplified schematic diagram of a modified driving arrangement of this invention.

DESCRIPTION OF THE EMBODIMENTS

According to the invention, this problem of an unintended activation of the braking device is solved in that a leakage fluid outlet opening of the hydraulic motor and a valve arrangement are connected with the release chamber, the valve arrangement maintaining, in the release position of the braking control valve, a pressure in the release chamber corresponding at least to the release pressure of the braking device.

With this solution, the pressure in the release chamber of the braking cylinder remains higher than the pressure in the spring chamber, also during a temporary or brief pressure drop in the pressure source below the predetermined pressure, so that the brake is not unintendedly activated.

Preferably, it is ensured that the valve arrangement is connected to an inlet line of the braking control valve, connected with the pressure source, the inlet line releasing, in the release position of the braking control valve, a flow from the release chamber to the braking control valve, when the pressure of the pressure source drops below the release pressure in the release chamber and the flow pressure power in the release chamber is higher than a spring force acting in the closing direction of the valve arrangement, the spring force being set at a higher value than the pressure power of the predetermined pressure of the pressure source in the release chamber.

A simple embodiment foresees that in the inlet line of the braking control valve connected with the pressure source, the valve arrangement has an unloaded non-return valve, closing in the direction of the pressure source, and a pressure valve connected to the inlet line between the non-return valve and the braking control valve, the pressure valve opening in the direction of the pressure source or the tank against the spring force of the valve arrangement by means of the pressure in the release chamber, however limiting the pressure in the release chamber to a higher value than the operating pressure of the braking arrangement. Thus, the spring chamber of the pressure valve can be connected with the tank or the pressure source.

The prior art hydraulic driving arrangement shown in FIG. 1 comprises a pump 1, which is driven via a driving shaft 2, for example by means of a combustion engine, and whose supply volume is adjustable for the purpose of changing the driving speed. Via motor lines 3 and 4, this pump 1 is connected with a hydraulic motor 5, whose output shaft 6 is connected with wheels (not shown) of the vehicle.

A pressure source 7 comprises a charge pump, driven together with the pump 1, the outlet 8 of the charge pump being connected with a pressure control valve 9 for the purpose of maintaining the charge pressure. Via unloaded non-return valves 10 and 11, the outlet 8 is also connected with the motor lines 3 and 4, respectively. By means of corresponding refilling processes, this maintains the charge pressure in the complete driving arrangement.

A flush valve 12 ensures that at predominant pressure in one motor line, pressure fluid is led out from the other motor line through a flush line 14 provided with an orifice 13 through a filter (not shown) to the tank 15. In this way, the motor lines are kept at a pressure that corresponds to the load pressure. The hydraulic motor 5 comprises a leakage fluid line 16, which is connected with the flush line 14 and thus with the tank 15. Via this leakage fluid line 16, pressurised fluid flows in accordance with the pressure on the pressure side of the motor and thus in dependence of the motor load.

A braking arrangement 17 (FIG. 2) with at least one brake is allocated to the motor shaft 6. The braking device 17 is operable via a braking cylinder 18, which has a spring chamber 20 with a spring arrangement 19 and a release chamber 21. The spring chamber 20 is connected via a line D and the release chamber 21 via a line R with a braking control valve 22, here in the form of an electromagnetically operated 4/2-way valve. Further, the braking control valve 22 is connected via an inlet line 23 with the outlet 8 of the pressure source 7 and thus carries load pressure. An additional line 24 leads to the tank 15. The leakage fluid line 16 and the flush line 14 are connected to the spring chamber 20.

In the shown release position of the braking control valve 22, in which it is activated, the spring chamber 20 carries tank pressure, which also applies for the ends of the flush line 14 and the leakage fluid line 16, connected with the spring chamber, whereas the release chamber 21 is loaded by the load pressure. When the braking control valve 22 is de-energised (deactivated), that is, is in the braking position, the release chamber 21 is connected with the tank 15, while the line D, that is, the flush line 14 extended beyond the spring chamber 20, is blocked. Accordingly, the pressure in the spring chamber 20 increases quickly to the value of the load pressure, because of the inflowing flush fluid, which can no longer flow off. The spring arrangement 19 is therefore supported in its braking function by the pressurised fluid pressure.

When, due to a defect, the pressure in the release chamber 21 fails during operation, merely the spring arrangement 19 acts upon the braking arrangement 17, so that the vehicle is braked. On the other hand, the braking arrangement 17 can also be activated unintendedly, when the pressure source 7 also supplies a working device of the vehicle, which is temporarily relieved in such a way that the pressure in the pressure source drops.

An additional reason for an unintended operation of the braking arrangement 17 is that when the vehicle drives, the flush valve 12 is open, so that fluid from the pressure source 7 flows to the tank 15 through the (closed circuit via the) hydraulic motor 5, the flush valve 12, the throttle 13, the flush line 24, the spring chamber 20, the braking control valve 22 and a (not shown) filter, to replace the leakage fluid and clean the pressurised fluid via the filter (thus flushing the driving device). During operation, however, the oil used as pressurised fluid is heated, so that its viscosity decreases, meaning that more oil flows through the flush line 14 and accordingly less oil flows through the pressure control valve 9 to the tank 15. Usually, the pressure control valve 9 has an increasing characteristic (the inlet pressure increases with increasing flow), because a pressure control valve with an increasing characteristic is less expensive. When the flow through the pressure control valve 9 is reduced, the pressure in the pressure source 7 is reduced accordingly, which pressure acts upon the release chamber 21 vial the line 23, the activated (in the position shown) braking control valve 22 and the connection R. Thus, the braking arrangement 17 is temporarily activated unintendedly by the spring arrangement 19, and the vehicle is braked.

The driving arrangement according to the invention, as shown in FIG. 3, has, further to the components shown in FIG. 1, a valve arrangement 25 connected to the inlet line 23 of the braking control valve 22, which inlet line 23 is connected with the pressure source 7. In the shown release position of the braking control valve 22, this valve arrangement releases a flow from the release chamber 21 to the braking control valve 22, when the pressure in the pressure source 7 drops below the release pressure in the release chamber 21 and the fluid pressure force in the release chamber 21 is higher than a spring force acting in the closing direction of the valve arrangement 25, the spring force being set to be higher than the pressure force of the predetermined pressure of the pressure source 7 in the release chamber 21. Further, the leakage fluid outlet opening of the hydraulic motor 5 is connected with the release chamber 21 via the leakage fluid line 16.

In the inlet line 23 of the braking control valve 22, connected with the pressure source 7, the valve arrangement 25 contains an unloaded non-return valve 26, which closes in the direction of the pressure source 7. Further, the valve arrangement 25 contains a spring-biased pressure valve 27, here a pressure control valve, connected to the inlet line 23 between the non-return valve 26 and the braking control valve 22, the pressure valve 27 opening against the pressure of its spring in the direction of the pressure source 7 by means of the pressure in the release chamber 21, however, limiting the pressure in the release chamber 21 to a higher value than the operating pressure of the braking arrangement 17. The pressurised fluid in the release chamber 21 is merely supplied through the leakage fluid line 16. Further, the spring chamber of the pressure valve 27 is connected with the tank 15. Its pressure is therefore balanced to the tank 15 and thus to the atmosphere. The connection to the tank 15 requires the running of an additional line. However, this causes that the pressure in the release chamber 21 is independent of the pressure of the pressure supply.

Alternatively, as shown in FIG. 4, the pressure valve 27 can open against its spring force in the direction of the tank 15 by means of the pressure in the release chamber 21. The spring chamber and the outlet of the pressure valve 27 are connected with the tank 15, the spring chamber and the outlet of the pressure valve 27 being, contrary to what is shown in FIG. 4, connected with each other inside the pressure valve 27. Thus, only one external connecting line is required, and leakage fluid from the hydraulic motor 5 is now led to the tank 15, where it is also filtered before reaching the circuit again.

In the embodiment according to FIG. 3, the non-return valve 26 closes, when a pressure drop in the pressure source 7 occurs during operation, so that the release pressure in the release chamber 21 is kept high via the leakage fluid line 16 of the hydraulic motor 5 in connection with a pressure reduction through the pressure valve 27. The amount of fluid permitted to pass the pressure valve 27 in its open position causes a certain increase of the flow of the pressure control valve 9, so that the pressure in the pressure source 7 increases somewhat again. As a result, the braking arrangement 17 is released again. The adjustment pressure of the pressure valve 27 is somewhat higher than that of the pressure control valve 9, so that the pressure in the pressure source 7 can never open the pressure valve 27.

In both embodiments according to the FIGS. 3 and 4, the spring chamber of the pressure valve can be connected with the pressure side of the pressure source 7 in stead of with the tank 15, as, in connection with a temporary pressure drop, the pressure in the release chamber 21 is also kept sufficiently high by the leakage fluid pressure via the line 16 in connection with the pressure reduction through the pressure valve 27, so that an activation of the braking arrangement 17 is not required.

Thus, it is seen that this invention will achieve its stated objectives.

We claim:

1. Hydraulic driving device for a vehicle, having a pressure source (7) generating a predetermined pressure for maintaining the operating pressure of a hydraulic motor (5), a braking cylinder (18) with a spring chamber (20) comprising a spring arrangement (19) for operating a braking arrangement (17) and a release chamber (21) that can be acted upon by pressurised fluid from the pressure source (7) against the force of the spring arrangement (19) with the purpose of retaining the braking device (17) in its release position, and having a braking control valve (22) that, in a release position, releases a flow from the pressure source (7) to the release chamber (21), characterised in that a leakage fluid outlet opening of the hydraulic motor (5) and a valve arrangement (25) are connected with the release chamber (21), the valve arrangement maintaining, in the release position of the braking control valve (22), a pressure in the release chamber (21) corresponding at least to the release pressure of the braking device (17).

2. A driving device according to claim 1, characterised in that the valve arrangement (25) is connected to an inlet line (23) of the braking control valve (22), connected with the pressure source (7), the inlet line (23) releasing, in the release position of the braking control valve (22), a flow from the release chamber (21) to the braking control valve (22), when the pressure of the pressure source (7) drops below the release pressure in the release chamber (21) and the flow pressure power in the release chamber (21) is higher than a spring force acting in the closing direction of the valve arrangement (25), the spring force being set at a higher value than the pressure power of the predetermined pressure of the pressure source (7) in the release chamber (21).

3. A driving device according to claim 1, characterised in that in the inlet line (23) of the braking control valve (22) connected with the pressure source (7), the valve arrangement (25) has an unloaded non-return valve (26), closing in the direction of the pressure source (7), and a pressure valve (27) connected to the inlet line (23) between the non-return valve (26) and the braking control valve (22), the pressure valve (27) opening in the direction of the pressure source (7) or the tank (15) against the spring force of the valve arrangement (25) by means of the pressure in the release chamber (21), however limiting the pressure in the release chamber (21) to a higher value than the operating pressure of the braking arrangement (17).

4. A driving device according to claim 3, characterised in-that the spring chamber of the pressure valve is connected with the tank or the pressure source.

* * * * *